United States Patent Office 3,207,200
Patented Sept. 21, 1965

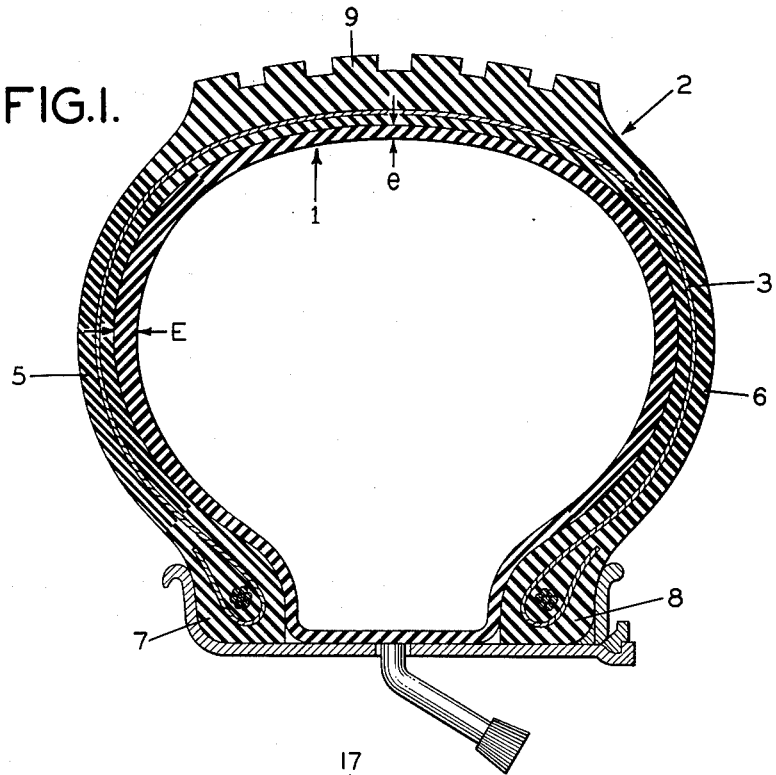
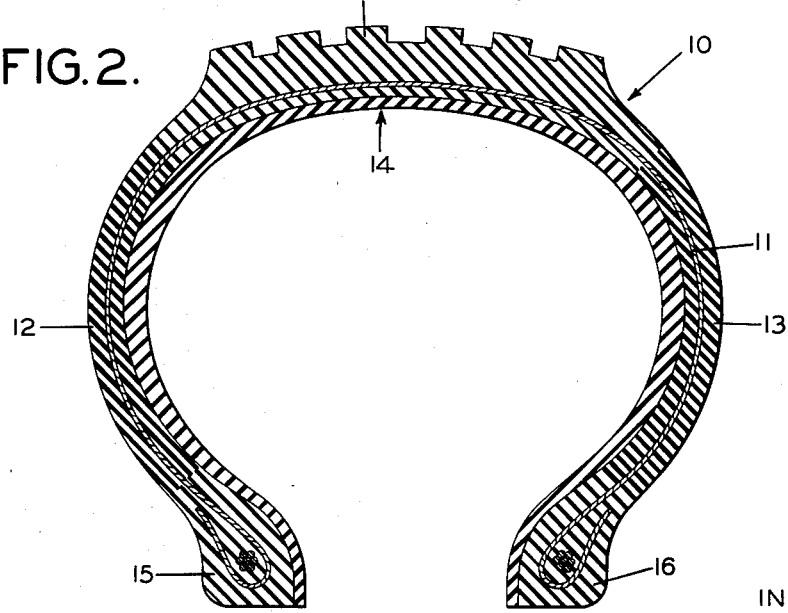

3,207,200
PNEUMATIC TIRES
Gabriel Xavier Roger Boussu, Barcelona, Masnou, Spain, and Georges Louis Travers, Clermont-Ferrand, France, assignors to Compagnie Generale des Etablissements Michelin, raison sociale Michelin & Cie, Clermont-Ferrand, France
Filed Apr. 15, 1964, Ser. No. 361,609
10 Claims. (Cl. 152—354)

This invention relates to improvements in pneumatic tires and tire casings and particularly to pneumatic tires or tire casings of the tube-containing and tubeless types and to the inner tubes for pneumatic tires.

This is a continuation-in-part of U.S. application Serial No. 191,199, filed April 30, 1962, now abandoned.

It is well known in the tire industry that the resistance that a tire opposes to rolling is to a substantial extent dependent on the hysteretic loss of the rubber compound, particularly at high speeds, i.e., the lower the hysteretic loss, the lower the resistance to rolling. For that reason, prior tires are composed of elastomeric compounds having a low hysteretic loss and the trend in tire manufacture is towards making the hysteretic loss even lower. Thus prior casings have been formed of elastomers (natural and synthetic rubbers) which have a low hysteretic loss, e.g., 20 to 25 percent, and a maximum of about 28 percent in the tubes for pneumatic tires.

The enhanced rolling efficiency of tires made of elastomers of low hysteretic loss is not without disadvantages. When tires composed of low loss elastomers on the wheels of a vehicle strike an obstacle, such as a stone or rough spot in the road, the wheels rebound sharply and the tires continue to vibrate over a period of substantial duration. Rebounding and tire vibration cannot be damped out quickly by conventional shock absorbers associated with the vehicle suspension.

The term "hysteretic loss" is used herein as that fraction of the energy exerted in the deforming of an elastomer which is not recovered on rebounding. The percent of hysteretic loss as referred to herein is measured with a Scott pendulum at 20° C.

In accordance with the present invention, the amplitude and duration of rebounding of the tire is very substantially reduced by forming the sidewalls or a portion thereof of the tire or tire casing or the portion of the inner tube or the liner for a tubeless or tube-containing tire, or both of an elastomer having a high hysteretic loss, i.e., between about 35% and 54%.

More particularly, in accordance with the invention, the amplitude and duration of the rebounding (vibration) of a tire on a vehicle wheel can be further reduced by providing an inner tube or the impermeable lining of a tubeless tire with thickened portions in the zones adjacent the sidewalls of the tire. Vehicles equipped with tire casings and/or tubes embodying the present invention have greatly improved riding comfort and roadability.

For a better understanding of the present invention, reference may be had to the accompanying drawing in which:

FIGURE 1 is a view in cross section of a tire casing containing an inner tube embodying the present invention mounted on a rim of the vehicle wheel;

FIGURE 2 is a view in cross section of a tubeless tire containing an air impervious liner embodying the present invention;

Figure 3:
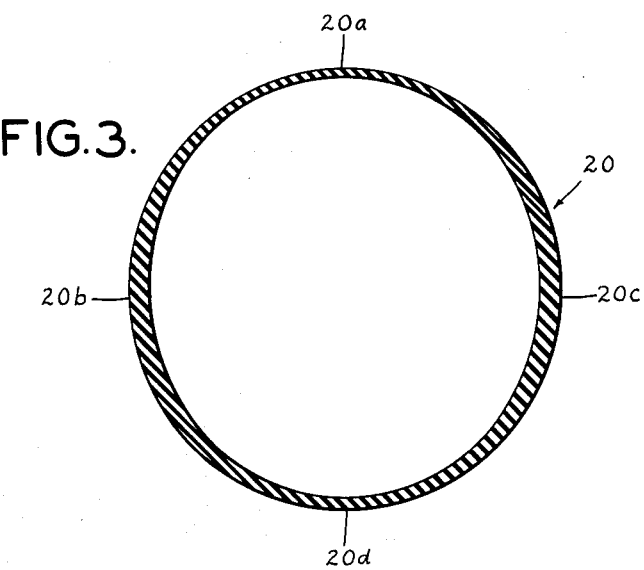
FIGURE 3 is a view in cross section of a modified from of inner tube embodying the invention.

As shown in FIGURE 1, an inner tube 1 is installed in a tire casing 2 which has a carcass 3 comprising meridianally directed cords, cables or the like formed of natural or synthetic fibers, metallic wires, strands or the like. The carcass can contain cords arranged other than meridianally and more than one layer of such cords can be provided in the carcass. In accordance with the invention, the portion of wall of the inner tube 1 at E is between about one and a half and three times the thickness $e$ of the remainder of the inner tube. Inner tubes have a wall thickness $e$ of about 1.50 mm. to 5.00 mm. depending on the size of the tire casing. The sides of the inner tube 1 at E accordingly will be at least 2.25 mm. thick and as much as 15.00 mm. or more thick. Also, as indicated by the heavy shading, that portion of the sidewalls of the tube adjacent to the sidewalls 5 and 6 of the tire casing is composed of an elastomer having a high hysteretic loss, i.e., between about 35% and 54%.

A suitable composition for use in the sides of the tube 1 is as follows:

| Components: | Parts by weight |
|---|---|
| Butyl rubber (sulfur vulcanizable copolymer of isobutylene and a small proportion of isoprene) | 61.2 |
| Zinc oxide | 3.1 |
| Petroleum plasticizer (a mixture of an oil soluble sulfonic acid and paraffin, with or without a high boiling, hydrophilic alcohol) | 3.1 |
| MPC black | 30.5 |
| Accelerators: | |
| Mercaptobenzothiazole | 0.3 |
| Tetramethylthiuram disulfide | 0.6 |
| Sulfur | 1.2 |
| | 100.0 |

When this compound is vulcanized, it has a hysteretic loss of about 54%.

Other suitable plasticizers and accelerators can be used instead of those specified above.

As indicated by the heavy shading, the sidewalls 6 and 5 of the casing 2 between the beads 7 and 8 and the tread 9 are also composed of an elastomer having a high hysteretic loss. An elastomer suitable for the sidewalls of the casing is as follows:

| Components: | Parts by weight |
|---|---|
| Brominated butyl rubber | 100 |
| Styrene-butadiene cold rubber | 50 |
| MPC black | 60 |
| Petroleum plasticizer | 10 |
| Sulfur | 2 |
| Mercaptobenzothiazole | 2 |
| Zinc oxide | 5 |
| Stearic acid | 2 |

After vulcanization, this elastomer has a hysteretic loss of about 45%.

In a tire casing having sidewalls composed substantially of the above described elastomer, the logarithmic decrement for absorption of rebound equals 0.46 as against 0.32 for sidewalls composed of an elastomer having a hysteretic loss of less than 35%, e.g. 20% to 25% as used in the sidewalls of prior tires.

The above described tire casing 2 may be used with a conventional natural or synthetic rubber tube and, in like fashion, the inner tube 1 may be installed in a conventional tire casing. In either case, the duration and amplitude of rebound of the tire is substantially decreased.

The tire 10 disclosed in FIGURE 2 is of the tubeless type. The carcass 11 of this tire may also be formed of meridianally extending cords or cables as described above. The sidewall portions 12 and 13 of the tire shown in heavy cross hatching are composed of an elastomer having a high hysteretic loss. Moreover, the sides of the inside air impervious coating or liner 14 for the tire have a high hysteretic loss and are thicker than normal in the zones adjacent the sidewalls of the tire. Typical liners for tubeless tires have a wall thickness between about 0.8 mm. and 1.6 mm. The sidewall portions of the liner are of the order of one and a half times to three times as thick as the remainder of the liner adjacent the beads 15 and 16 and the tread 17 and accordingly, are between about 1.2 mm. and 4.8 mm. thick or even more. The heavily hatched sides of the tire and its liner may be formed of the exemplary elastomers described above or of other equivalent elastomers, for example, an elastomer based on natural rubber, as follows:

| Components: | Parts by weight |
|---|---|
| Natural rubber | 100 |
| Zinc oxide | 5 |
| Anti-oxidant | 2 |
| Stearic acid | 2 |
| MPC black | 68 |
| Pine tar (plasticizer) | 8 |
| Phenolic resin | 15 |
| Sulfur | 2 |
| Accelerator (benzothiazyle and monocyclothiazyle-N-monocyclohexylsulfenamid) | 0.9 |

After vulcanization, this compound has a hysteretic loss of about 41%.

The exemplary elastomers described above differ from the elastomers used in prior tires and tubes in the following particulars;

(1) The carbon black content is higher than usual,
(2) The plasticizer content is also higher than conventional,
(3) The amount of accelerator, including sulfur, is lower than normal.

As indicated above, the use of rubber of high hysteretic loss adjacent to or in the sidewalls of a tire casing, has the greatest effect in dampening rebound of the tires. The use of high hysteretic loss rubber in the tread zone contributes to an increase in rolling resistance and, accordingly, it is desirable to keep the amount of elastomer of high hysteretic loss to a minimum in a tread zone.

Figure 4:
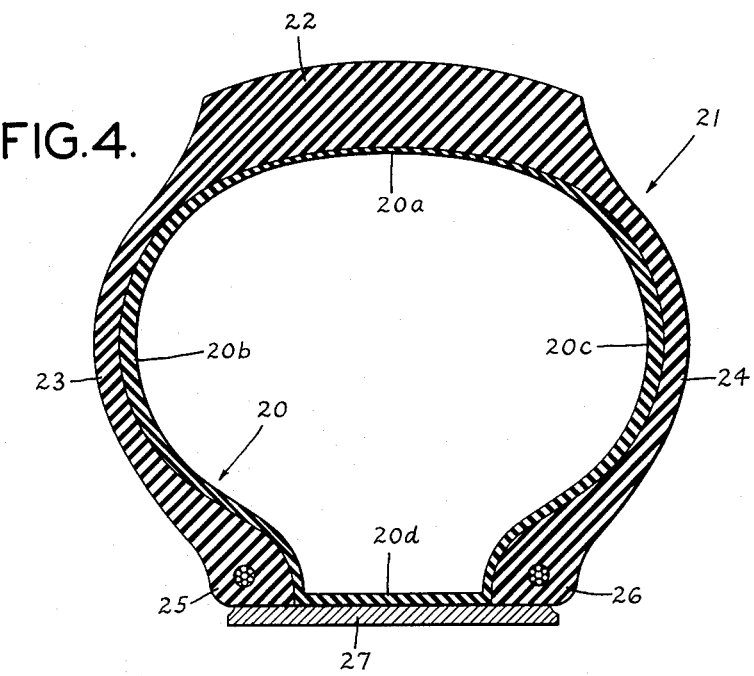
FIGURE 4 is a cross sectional view of a tire casing mounted on a portion of a wheel rim with the inner tube shown in FIGURE 3 mounted therein.

As shown in FIGURES 3 and 4, an inner tube is provided which satisfies the above indicated requirements and permits the inner tube to be composed entirely of an elastomer having a hysteretic loss of between about 35% and 54%. To that end, the inner tube 20 shown in FIGURE 3 has a portion 20a which is to be disposed adjacent to and behind the tread having about the same thickness as a conventional inner tube, e.g., between about 1.50 mm. and 5.00 mm. in thickness. In a typical inner tube, for instance for a tire casing of the commercial size 18.00–25, the thickness of the portion 20a is 4.5 mm. The portions 20b and 20c, which are to be disposed adjacent the sidewalls of the tire are between one and a half and about three times as thick as the portion 20a. In a typical example, the maximum thickness of the sidewall portions 20b and 20c is about 10 mm. The portion 20d which is disposed adjacent the beads of the tire and the rim base is somewhat thicker than the portion 20a but thinner than the sidewall portions 20b and 20c. In a typical tire, the maximum thickness of the portion 20d is approximately 5.5 mm.

As shown in FIGURE 3, the sidewall engaging, rim engaging and tread engaging portions of the tube taper gradually in thickness forming smooth inner and outer surfaces. A tube of the type disclosed in FIGURE 3 when mounted in a tire casing 21 as shown in FIGURE 4 and inflated does not stretch uniformly because of the variation in the thickness in the walls of the inner tube. The portion 20a which is disposed adjacent to the tread 22 stretches more than the other portions so that a thin wall section is disposed adjacent the tread. The portions 20b and 20c adjacent the sidewalls 23 and 24 of the tire casing stretch but not as much as the portion 20a. Likewise, the portion 20d adjacent the beads 25 and 26 and the rim 27 stretches somewhat more than the portions 20b and 20c but not as much as the portion 20a of the inner tube. The end result is that the thicker portions of high hysteretic loss of the inner tube are disposed adjacent to the sidewalls where their effect is the greatest, whereas the thinnest portion 20a of the inner tube is adjacent to the tread where it imposes the least resistance to rolling of the tire. By providing the inner tube with the thicker portion 20d which faces the beads and rim, installation of the inner tube is facilitated and incorrect positioning of the tube is avoided. The portion 20d being thicker than the portion 20a, the latter stretches more than the former, thereby setting up a force which tends to pull the portions 20b and 20c towards the tread 22 and to urge them into their correct position despite a friction against the inner wall of the tire casing tending to hinder a correct positioning of the inner tube.

It has been found that when the portions of the tube adjacent the sidewalls is increased in an amount of approximately one and a half the thickness of the remainder of the inner tube, a very marked reduction in bouncing is obtained. Increases in thickness beyond one and a half times produces a progressively smaller reduction of rebounding with a maximum effect obtained with an increase in wall thickness of two to three times. Accordingly, while the thickness of the sides of the inner tube can be increased more than three times the thickness of the conventional inner tube, no particular advantage is gained therefrom. For practical purposes, therefore, the maximum thickness of the sidewalls of the tube or a liner for a tubeless tire should be between about one and a half and three times the thickness of a conventional inner tube.

From the preceding description of typical tires, tire casings and tubes embodying the present invention, it will be apparent that they have properties and characteristics different from the prior tires and tubes which greatly improve the riding comfort of the vehicle and also greatly improve the roadability of the vehicle equipped with the new tires and/or tubes. It will be understood that elastomers other than those of the examples can be produced which have the desired high hysteretic loss and accordingly, the embodiments of the invention described herein should be considered as illustrative and not limiting. Also, giving the sidewall portions of the tire casing an increased thickness of high hysteretic loss elastomer, preferably externally of the carcass cords in the region of the maximum width of the tire casing, enhances the damping effect and is therefore within the scope of the invention.

We claim:

1. A pneumatic tire, comprising a tire casing having a tread, sidewalls, a carcass in said sidewalls and rim-engaging beads, an air impervious liner in said casing extending at least from one bead along said sidewalls and tread to at least the other bead, a portion of said sidewalls only being composed of a elastomer having a hysteretic loss between about 35% and about 54%.

2. The tire set forth in claim 1 in which said carcass is embedded in said elastomer.

3. The tire set forth in claim 2 in which there is an increased thickness of said elastomer at least externally of said carcass.

4. The tire set forth in claim 1 in which the portions of the liner adjacent only to said sidewalls are composed of said elastomer.

5. The tire set forth in claim 4 in which said air impervious liner is an inner tube.

6. An inner tube for a pneumatic tire comprising an inflatable endless tube having a portion to be disposed adjacent to the rim of a vehicle wheel, portions to be disposed adjacent to the sidewalls of a tire casing and a portion to be disposed adjacent to the tread portion of said tire casing, only the portions of the tube to be adjacent said sidewalls being composed of an elastomer having a hysteretic loss between 35% and about 54%.

7. The inner tube set forth in claim 6 in which the portions of said tube to be adjacent said sidewalls are thicker than the other said portions of said tube.

8. An inner tube for a pneumatic tire comprising an inflatable endless tube having a first portion to be disposed adjacent to the rim of a vehicle wheel, second and third portions to be disposed adjacent to the sidewalls of a tire casing and a fourth portion to be disposed adjacent to the tread portion of said tire casing, said tube being composed of an elastomer having a hysteretic loss between about 35% and 54%, said second and third portions each having a maximum thickness at least one and a half time as thick as said fourth portion and said first portion having a maximum thickness greater than said fourth portion and less than said second and third portions.

9. The inner tube set forth in claim 8 in which said fourth portion is between about 1.50 mm. and 5.00 mm. thick.

10. The inner tube set forth in claim 9 in which said second and third portions each has a maximum thickness between about one and a half and three times as great as said fourth portion.

References Cited by the Examiner

UNITED STATES PATENTS 3,062,257   11/62   Campbell _____ 152—354

FOREIGN PATENTS 530,065   9/56   Canada.

ARTHUR L. LA POINT, *Primary Examiner.*